No. 788,903. PATENTED MAY 2, 1905.
W. V. HEINZ.
NOODLE CUTTER.
APPLICATION FILED NOV. 19, 1903.
2 SHEETS—SHEET 1.
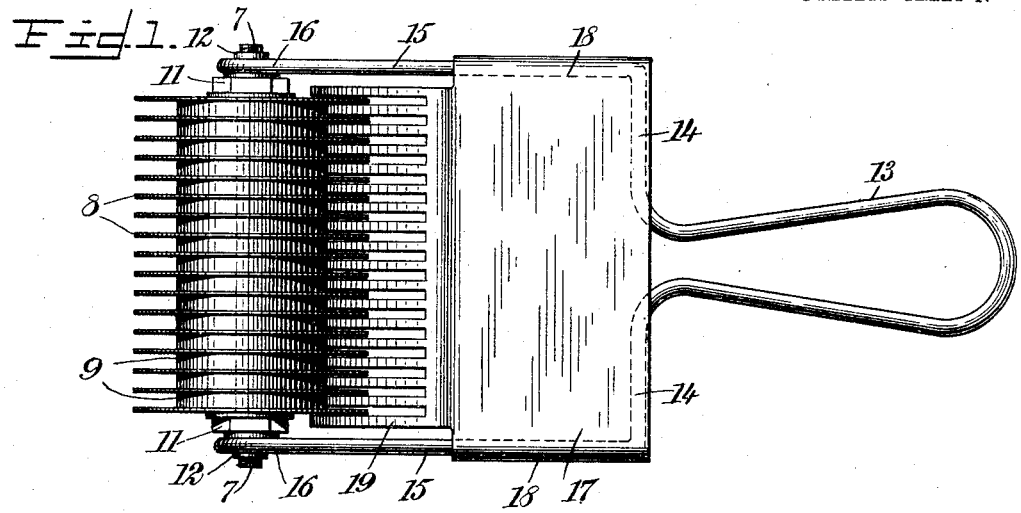
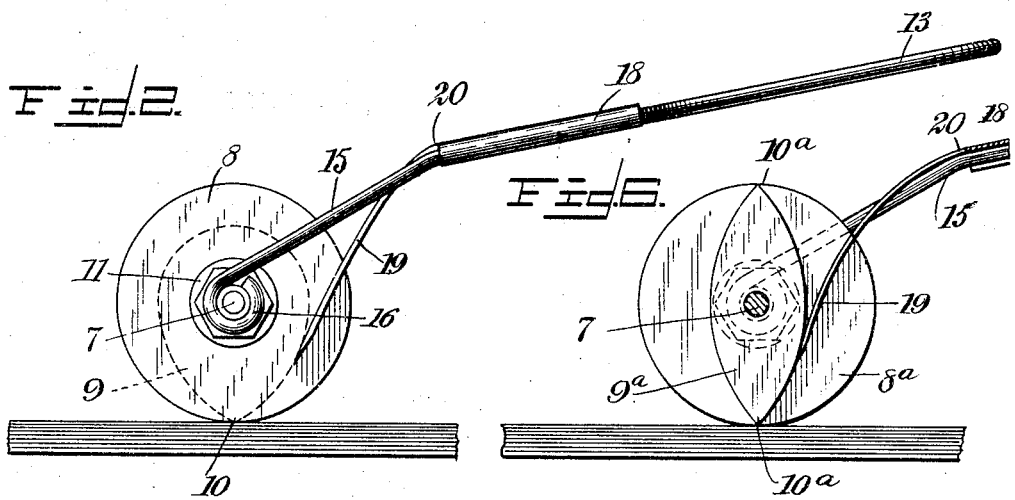
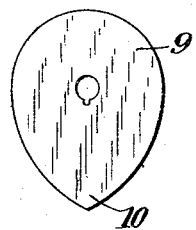 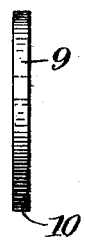 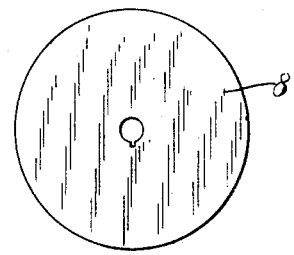
WITNESSES:
AB Mattingly
W. H. Reid.
INVENTOR
William V. Heinz
BY
ATTORNEYS No. 788,903. PATENTED MAY 2, 1905.
W. V. HEINZ.
NOODLE CUTTER.
APPLICATION FILED NOV. 19, 1903.

2 SHEETS—SHEET 2.

WITNESSES:

INVENTOR
William V. Heinz
BY
ATTORNEYS

No. 788,903. Patented May 2, 1905.

UNITED STATES PATENT OFFICE.

WILLIAM VINCENT HEINZ, OF LASALLE, ILLINOIS.

NOODLE-CUTTER.

SPECIFICATION forming part of Letters Patent No. 788,903, dated May 2, 1905.

Application filed November 19, 1903. Serial No. 181,785.

*To all whom it may concern:*

Be it known that I, WILLIAM VINCENT HEINZ, a citizen of the United States, and a resident of Lasalle, in the county of Lasalle and State of Illinois, have invented new and useful Improvements in Noodle-Cutters, of which the following is a full, clear, and exact description.

This invention relates to a device for cutting dough into narrow strips, such as noodles.

The object of the invention is to provide an improved device that will cut a parallel series of strips out of a flat piece of dough and at proper intervals will sever the strips for the purpose of making them of uniform length.

My invention comprises the novel features of construction and arrangement, as hereinafter set forth and then particularly pointed out in the claims.

Reference is to be had to the accompanying drawings, forming a part of this specification, in which similar characters of reference indicate corresponding parts in all the figures.

Figure 7:
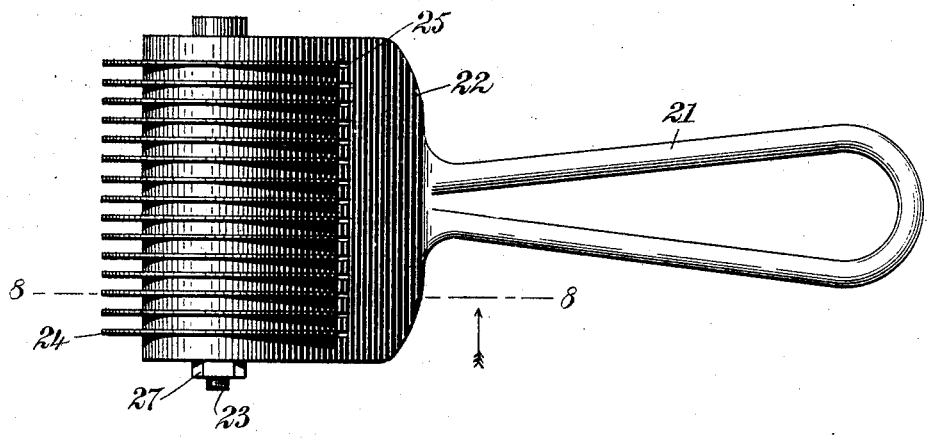
Figure 8:
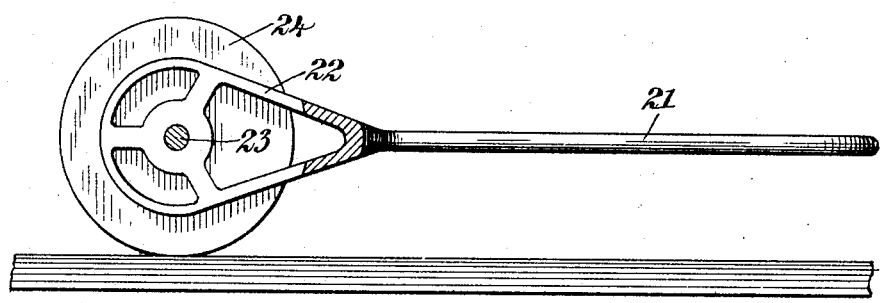

Figure 1 is a plan view of a device embodying my invention. Fig. 2 is a side elevation of the same. Fig. 3 is a front elevation of one of the cutting disks or washers. Fig. 4 is an edge view of the latter disk. Fig. 5 is a front elevation of one of the cutting-disks.
Fig. 6 is a side elevation of a modified construction. Fig. 7 is a plan view of a further modification, and Fig. 8 is a section on the line 8 8 in Fig. 7.

Referring now to the accompanying drawings, I provide a spindle 7, having mounted thereon a series of thin circular cutting-disks 8. Between the disks 8 are interposed disks or washers 9 of less diameter than the disks 8, but having projecting cutting portions 10, that are flush with the periphery of the disks 8 when the disks 8 and washers 9 are mounted on the spindle 7, the washers being somewhat heart-shaped, as will be seen from Fig. 3. In assembling these members the points 10 are brought into alinement, as indicated by the broken line in Fig. 2. The disks and washers are secured together on the spindle 7 by means of a nut 11 at each end portion 12 of the spindle 7, projecting beyond the nuts 11.

I provide a frame or handle member consisting of a handle portion 13, having the oppositely-bent portions 14 and the parallel side members 15, each of which has a loop 16, that encircles the end portion 12 of the spindle, thus rotatably supporting the cutting members.

In order to prevent the dough from accumulating in the spaces between the cutting-disks, and thereby clogging up the device, I provide a stripper member consisting of a plate 17, having its side portions 18 bent around the sides 15 of the frame and having a comb-like portion 19, of which the squared end pieces project into the spaces between the disks in close proximity to the washers 9. As will be seen from Fig. 2, the comb portion of the plate is bent downwardly at 20, and being constructed of elastic metal it will bend when the cutting portions 10 of the washers come into engagement with the teeth of the comb and immediately thereafter will bend back again, following the contour of the peripheries of the washers.

At each rotation of the cutter the strips are severed into lengths equal to the circumference of the disks.

In Fig. 6 of the drawings a modified construction is shown, consisting in employing washers $9^a$ substantially oval in contour and having cutting portions $10^a$ at their ends extending to the peripheries of the disks $8^a$, the spindle 7 being concentric to the peripheries of the disks $8^a$.

In Figs. 7 and 8 of the drawings is shown a further modification of the device, designed for cutting the dough into strips. The handle 21 and the body portion 22 are cast in one piece, said body portion being hollow or in skeleton form, and in said body portion is centrally located a spindle 23, upon which are mounted to turn in slots 25, formed in the body portion 22, a series of cutting-disks 24. The spindle 23 may have a head at one end, as shown, or may be threaded at said end and screwed into the body portion 22, the other end of said spindle being threaded to receive a nut 27. The slots 25 in the body portion 22 serve to prevent the cutting-disks 24 from wabbling and cause them to follow a straight course. In this form of the device the body portion serves as a stripper member to prevent the cutting-disks from clogging. It will be seen that under this construction the device may be readily taken apart or assembled and that as many cutting-disks as desired may be employed.

Having thus described my invention, I claim as new and desire to secure by Letters Patent—

1. The combination of a frame, a spindle carried by the frame, a series of cutting-disks mounted on the spindle, and a series of washers interposed between the disks, and having projecting cutting portions extending toward the peripheries of the disks.

2. The combination of a frame, a spindle carried by the frame, a series of cutting-disks mounted on the spindle, washers interposed between the disks, said washers being of less diameter than the disks but having cutting portions extending to the peripheries of the disks, the disks being arranged with their cutting portions in alinement, and a retaining member on each end of the spindle.

3. The combination of a frame, a spindle carried by the frame, a series of cutting-disks mounted on the spindle, washers interposed between the disks, the washers being of less diameter than the disks, and having cutting portions extending to the peripheries of the disks, and a stripping member having teeth disposed between the disks and arranged to have the ends of the teeth in constant engagement with the peripheries of the washers.

4. The combination of a frame, a spindle carried by the frame, a series of disks mounted on the spindle, washers interposed between the disks, each washer being of a diameter less than that of the disks and having cutting portions extending to the peripheries of the disks, a retaining means on each end of the spindle, and an elastic stripping member having teeth projecting into the spaces between the disks, the ends of the teeth being in constant engagement with the peripheries of the washers.

5. The combination of a frame, a spindle carried by the frame, a series of cutting-disks mounted on the spindle, and a series of radially-projecting cutters arranged between the said disks.

6. The combination of a frame, a spindle carried by the frame, a series of cutting-disks mounted on the spindle, and a series of radially-projecting cutters arranged between the said disks and extending to the peripheries of the disks.

In testimony whereof I have signed my name to this specification in the presence of two subscribing witnesses.

WILLIAM VINCENT HEINZ.

Witnesses:
   JNO. J. McDONALD,
   S. J. MARENDA.